United States Patent
Gottschlich et al.

(10) Patent No.: US 10,755,325 B2
(45) Date of Patent: Aug. 25, 2020

(54) DISPLAYING LISTINGS BASED ON LISTING ACTIVITY

(75) Inventors: Klaus Juergen Gottschlich, Alcobendas (ES); Paolo Ragone, Sydney (AU)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/338,534

(22) Filed: Dec. 28, 2011
(Under 37 CFR 1.47)

(65) Prior Publication Data
US 2012/0306894 A1      Dec. 6, 2012

Related U.S. Application Data

(63) Continuation of application No. PCT/ES2011/070073, filed on Feb. 3, 2011.

(60) Provisional application No. 61/301,524, filed on Feb. 4, 2010.

(51) Int. Cl.
*G06Q 30/06* (2012.01)
*G06Q 30/02* (2012.01)
*G06F 16/951* (2019.01)
*G06F 16/957* (2019.01)

(52) U.S. Cl.
CPC ....... *G06Q 30/0603* (2013.01); *G06F 16/951* (2019.01); *G06F 16/957* (2019.01); *G06Q 30/02* (2013.01)

(58) Field of Classification Search
CPC ............ G06F 17/30899; G06F 16/957; G06F 16/951; G06Q 30/02; G06Q 30/0603
USPC ................................. 707/722, 723
See application file for complete search history.

(56) References Cited

U.S. PATENT DOCUMENTS

| | | | |
|---|---|---|---|
| 6,772,150 B1 * | 8/2004 | Whitman | G06F 17/30448 707/721 |
| 7,117,207 B1 * | 10/2006 | Kerschberg et al. | |
| 7,295,995 B1 | 11/2007 | York et al. | |
| 2001/0029478 A1 * | 10/2001 | Laster | G06Q 30/08 705/37 |

(Continued)

FOREIGN PATENT DOCUMENTS

| | | |
|---|---|---|
| EP | 2533163 A1 | 12/2012 |
| WO | WO 2008012601 A2 * 1/2008 | ............. G06Q 10/00 |

(Continued)

OTHER PUBLICATIONS

M Richardson et al. https://pdfs.semanticscholar.org/d80c/03be2ef28a94229473c9c8484ae98d0cd003.pdf (Year: 2007).*

(Continued)

*Primary Examiner* — Matthew J Ellis
(74) *Attorney, Agent, or Firm* — Schwegman Lundberg & Woessner, P.A.

(57) ABSTRACT

Systems and methods for enabling a display of listings based on listing activity are disclosed herein. In one embodiment, activity information of a listing displayed among multiple listings is accessed. Whether the activity information of the listing conforms to one or more criteria is determined. A priority of the listing relative to the multiple listings is altered based on the activity information of the listing conforming to the one or more criteria. The listing is displayed among the multiple listings according to the altered priority of the listing.

18 Claims, 4 Drawing Sheets

(56) References Cited

U.S. PATENT DOCUMENTS

| | | | | |
|---|---|---|---|---|
| 2002/0082977 | A1* | 6/2002 | Hammond | G06Q 30/02 705/37 |
| 2003/0220912 | A1* | 11/2003 | Fain et al. | 707/3 |
| 2005/0049907 | A1* | 3/2005 | Kumar et al. | 705/10 |
| 2006/0036567 | A1* | 2/2006 | Tan | G06Q 30/08 |
| 2006/0095431 | A1* | 5/2006 | Nash | G06Q 30/0617 |
| 2006/0161534 | A1* | 7/2006 | Carson et al. | 707/3 |
| 2006/0167852 | A1 | 7/2006 | Dissett et al. | |
| 2007/0067267 | A1* | 3/2007 | Ives | 707/3 |
| 2007/0192300 | A1* | 8/2007 | Reuther | G06F 16/2452 |
| 2007/0226205 | A1* | 9/2007 | Carrer | G06F 17/30864 |
| 2007/0250468 | A1* | 10/2007 | Pieper | G06F 17/30867 |
| 2007/0255512 | A1* | 11/2007 | Delenstarr | G06F 19/28 702/35 |
| 2007/0255702 | A1* | 11/2007 | Orme | G06F 17/30696 |
| 2008/0059348 | A1* | 3/2008 | Glassman | G06Q 30/02 705/35 |
| 2008/0065514 | A1* | 3/2008 | Eaton | G06Q 10/087 705/26.3 |
| 2008/0072247 | A1* | 3/2008 | Barnard | H04H 20/82 725/32 |
| 2009/0012965 | A1* | 1/2009 | Franken | G06Q 10/10 |
| 2009/0234825 | A1* | 9/2009 | Xia | G06F 17/30867 |
| 2009/0265229 | A1* | 10/2009 | Sidhu | G06Q 30/02 705/14.69 |
| 2009/0276729 | A1* | 11/2009 | Cantu-Paz | G06F 17/30873 715/811 |
| 2010/0057550 | A1* | 3/2010 | Nguyen | G06Q 30/02 705/14.25 |

FOREIGN PATENT DOCUMENTS

| | | |
|---|---|---|
| WO | WO-2008012601 A3 | 1/2008 |
| WO | WO-2011095667 A1 | 8/2011 |

OTHER PUBLICATIONS

"International Application Serial No. PCT/ES2011/070073, International Search Report dated Jul. 7, 2011", 3 pgs.

"International Application Serial No. PCT/ES2011/070073, Written Opinion dated Jul. 7, 2011", 3 pgs.

"European Application Serial No. 11739429.6, Extended European Search Report dated Mar. 12, 2015", 9 pgs.

"European Application Serial No. 11739429.6, Response filed Feb. 20, 2013", 9 pgs.

Srivastava, et al., "Web Usage Mining: Discovery and Applications of Usage Patterns from Web Data", Sigkdd Explorations, (Jan. 1, 2000), 12-23.

"European Application Serial No. 11739429.6, Response filed Sep. 21, 2015 to Extended European Search Report dated Mar. 12, 2015", 13 pgs.

"European Application Serial No. 11739429.6, Communication Pursuant to Article 94(3) EPC dated Jun. 1, 2018", 7 pages.

"International Preliminary Report on Patentability received for PCT Application No. PCT ES2011 070073, dated Aug. 16, 2012", (w English Translation), (dated Aug. 16, 2012), 20 pages.

* cited by examiner

DISPLAYING LISTINGS BASED ON LISTING ACTIVITY

RELATED APPLICATIONS

This application is a continuation of, and claims the benefit of, International Application No. PCT/ES2011/070073, entitled "DISPLAYING LISTINGS BASED ON LISTING ACTIVITY," filed Feb. 3, 2011, which claims the benefit of U.S. Provisional Application No. 61/301,524, entitled "DISPLAYING LISTINGS BASED ON LISTING ACTIVITY," filed Feb. 4, 2010. Each of these applications is hereby incorporated herein by reference in its entirety.

TECHNICAL FIELD

This application relates to a method and system for use with a website or an electronic commerce system, according to one embodiment, and more specifically, for enabling the display of listings based on listing activity.

BACKGROUND

Many websites provide listings of items to a user. For example, consumer-focused websites may provide a listing of items for sale, services for sale, promotions, or advertisements; news websites may provide a listing of news items; and social networking websites may provide a listing of user profiles or user profile updates. If a user cannot find a listing, the user will not be able access the listing. For example, if a user cannot find a listing for an item for sale on a consumer-focused website, the user will not be able to view, purchase, offer to buy, or bid on the item.

Listings are typically displayed in some order. For example, listings of items for sale may be presented in a list and ordered based on listing creation date, expiration date, item price, popularity, or some other factor. Listings displayed toward the beginning of a listing interface (e.g., on the first page or in the first few pages of a listing website) tend to have a higher selection rate than those displayed thereafter, indicating that greater attention is paid to listings displayed toward the beginning of a listing interface.

BRIEF DESCRIPTION OF THE DRAWINGS

The various embodiments are illustrated by way of example, and not by way of limitation, in the figures of the accompanying drawings in which.

DETAILED DESCRIPTION

Figure 1:
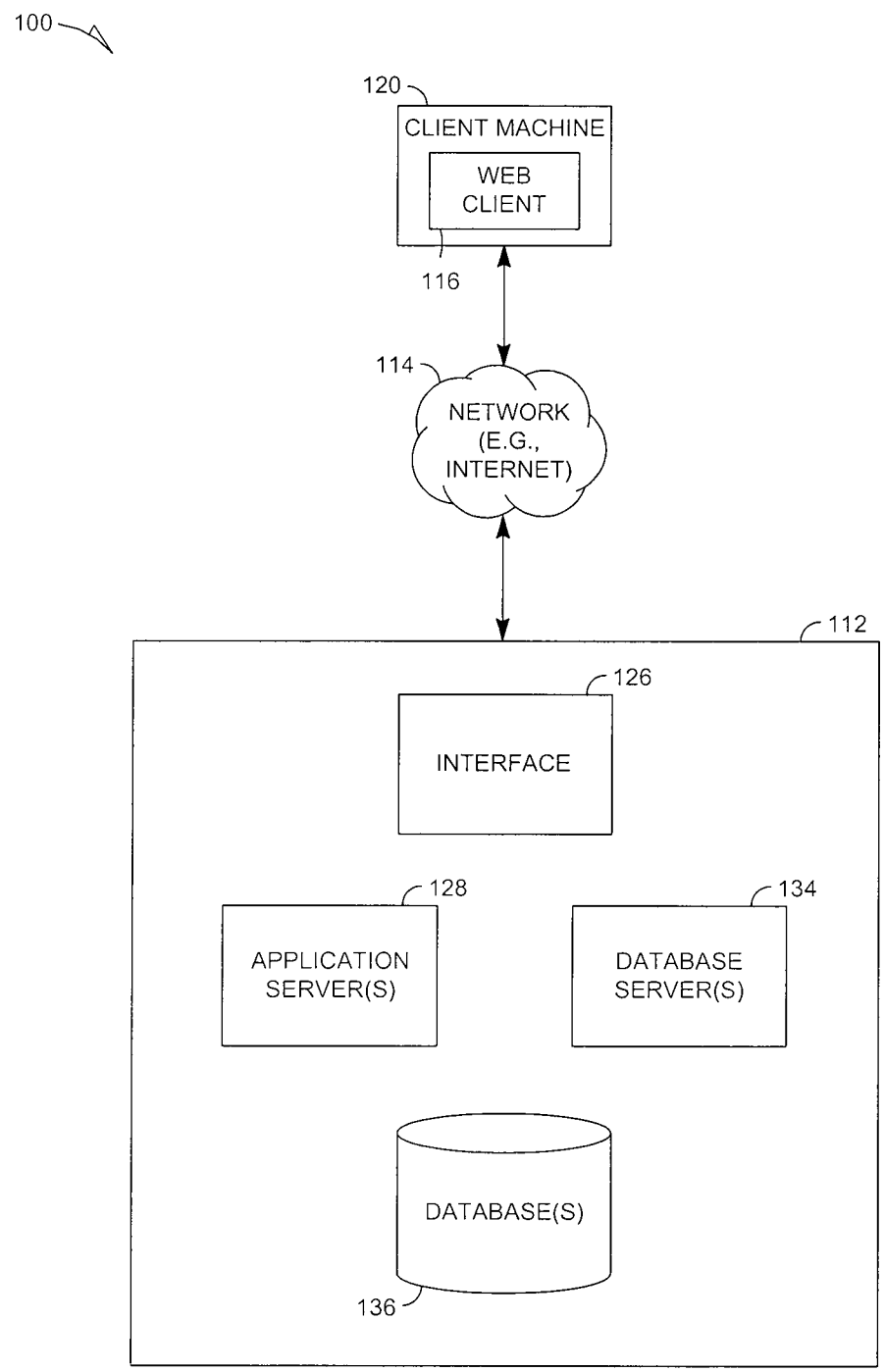
FIG. 1 is a network diagram depicting a network system, according to one embodiment, having a client-server architecture configured for exchanging data over a network.

In the following description, for purposes of explanation, numerous specific details are set forth in order to provide a thorough understanding of the various embodiments. It will be evident, however, to one of ordinary skill in the art that the various embodiments may be practiced without these specific details.

In various embodiments, a system and method for enabling the display of listings based on listing activity is disclosed. The system and method enable a "bump up," or increase in the priority, of a listing, and thereby enable the listing to be presented earlier in, or closer to the beginning of, a listing interface. The priority of a listing may be modified (e.g., increased or decreased) based on listing activity. A listing is any entry in an ordered compilation of listings. The compilation of listings may be presented in a listing interface such as one or more web pages, a widget, a slideshow, or some other user interface. In some embodiments, each listing in the ordered compilation of listings has an associated priority, and the listing with the highest priority is presented first or at a first position. For example, in a compilation of listings prioritized by publication date, the listing with the most recent publication date may be presented at the top or beginning of the compilation.

The priority of a listing may be modified based on one or more criteria. These criteria may be used to further one or more objectives. For example, in one embodiment on an internet commerce website, such as an auction website or a classifieds website wherein one or more sellers may offer for sale items that are in limited quantity, the sellers may list items for sale. Some example objectives would be to present listings that are still available (e.g., have not been sold) to potential buyers, to present quality listings to potential buyers, to increase the number of sellers' listings that receive replies, increase the number of transactions, and so on. These objectives may be addressed by using the criterion of increasing the priority of listings that, for example, are quality listings that are still available.

To determine which listings should be prioritized, a listing engine may analyze listing activities or listing information associated with each listing. These listing activities may be any activity associated with the listing that is monitored. A listing engine may track listing activities such as the time the listing was created or published, the number of times the listing was shown, the number of user selections of the listing (e.g., page views), replies to the item listing (which may include comments, questions, reviews, or any other response to an item listing, in the context of internet commerce websites replies), the click-through rates of the listing, or some other activity associated with the listing that may be monitored.

Listing activities may be analyzed and used to derive information about the listing. In one embodiment, listing activities may be used to determine a likelihood that the item listed for sale is still available. For example, the time that has elapsed since the item was listed for sale (e.g., the item listing was published) may indicate a likelihood that an offer or bid has been made on the item or the item has been sold. More specifically, the greater the elapsed time, the greater the likelihood that an offer or bid was made on the item or the item was sold. The number of page views or replies to a listing may also indicate a greater likelihood that an offer or bid was made on the item or the item was sold. A listing is likely still available if the listing has a low number of views or no views or a low number of replies or no replies. In other words, online listings that have not been seen or acted upon are likely to be listings that remain available.

Additionally, other types of listing activities (or lack thereof) related to listings may also be used to characterize a listing. For example, bid, offer, and watch activities may also be used to determine the activity level of a particular listing and give an indication as to its availability. Bid activity relates to the number of bids that may have been made on an item associated with a listing. Offer activity relates to the number of offers that may have been placed on an item associated with a listing. Watch activity relates to the number of users who may have indicated an interest in watching the activity for a particular item associated with a listing.

In another embodiment, various click-through rates may also be used as an indication of the quality of a listing as presented on a web page, an advertisement, or other user accessible interface. For example, a compilation of listings may be presented in a listing interface provided on a classifieds website. Each listing in the compilation of listings may be presented as links (e.g., text links, graphical links, widgets containing a link, buttons, and so on) in the listing interface. The click-through rate of the link (e.g., the number of times the link is selected, divided by the number of times the link was presented) may indicate a relative quality or efficacy of the link. Where a link takes a user to an item-listing webpage, other click-through rates (e.g., the rate at which users select or click-through to a reply link, a purchase link/button, links to more information, and the like) may be used to determine a relative quality or efficacy of the item-listing webpage.

In some embodiments involving internet commerce websites such as an auction website or a classifieds website, modifying the priority of certain item listings in a listing interface may increase the efficacy of the listings for both a seller and potential buyers using the commerce website. For example, potential buyers may be presented with available and/or higher quality listings earlier on in the listing interface, and sellers may have their available listings prioritized and presented earlier on in the listing interface, thereby increasing the odds that potential buyers will view the listings.

Although many of the embodiments discussed are related to listings on internet-based commerce sites, the present disclosure is not limited to this realm. For example, embodiments may be used in news websites that provide a listing of news items, social networking websites that provide a listing of user profiles or user profile updates, online forums that provide user posts, off-line applications that provide a listing of items such as a catalog of files (digital and/or hardcopy), and other situations in which listings are presented to a user.

FIG. 1 is a network diagram depicting a network system 100, according to one embodiment, having a client-server architecture configured for exchanging data over a network. For example, the network system 100 may be a trading/commerce system where clients may communicate and exchange data with the trading/commerce system, and the data may pertain to various functions (e.g., online purchases) and aspects (e.g., managing social networks) associated with the network system 100. Although illustrated herein as a client-server architecture for simplicity, in other embodiments the network architecture may vary and include an architecture such as a peer machine in a peer-to-peer (or distributed) network environment.

Returning to FIG. 1, a data exchange platform, in an example form of a network-based provider (or host system/site) 112, provides server-side functionality, via a network 114 (e.g., the Internet) to one or more clients or client machines 120 using a client application or web client 116. The one or more clients may include users that may utilize the network system 100 and, more specifically, the network-based provider 112, to exchange data over the network 114. These transactions may include transmitting and/or receiving (communicating) and processing data to and from the multitude of users. The data may include, but is not limited to, user preference information; user profile information; classified ad search queries; shopping or listing context information and/or identifiers; context data; notations (e.g., personal and public shopping notes); context filter data; shared electronic shopping carts; product and service reviews; product, service, manufacturer, and vendor recommendations and identifiers; product and service listings associated with buyers and sellers; auction bids; user feedback; and so forth.

Turning specifically to the network-based marketplace 112, an interface 126 may comprise an application program interface (API) server and/or a web server and may be coupled to, and provide programmatic and web interfaces to, one or more application servers 128. The application servers 128 host one or more networking application(s) and marketplace application(s). The application servers 128 may be coupled to one or more database servers 134 that facilitate access to one or more databases 136.

The application server(s) 128 may provide a number of marketplace functions and services (e.g., presentation of item listings, item searching functionality, advertisements, payment services, and the like) to users that access the network-based marketplace 112. The application server(s) 128 may also provide a number of consumer services, merchant services, or social networking services and functions to users. The application server(s) 128 may enable a user to create listings (e.g., for products and services), advertisements, web pages, and so on. The application server(s) 128 may also enable a compilation of listings in a listing interface to be shown to a user on a client machine 120. In one embodiment, the application server(s) 128 also host a listing engine that is able to monitor activity information for multiple listings, derive information about a listing, and modify a priority of a listing based on one or more objectives.

Figure 2:
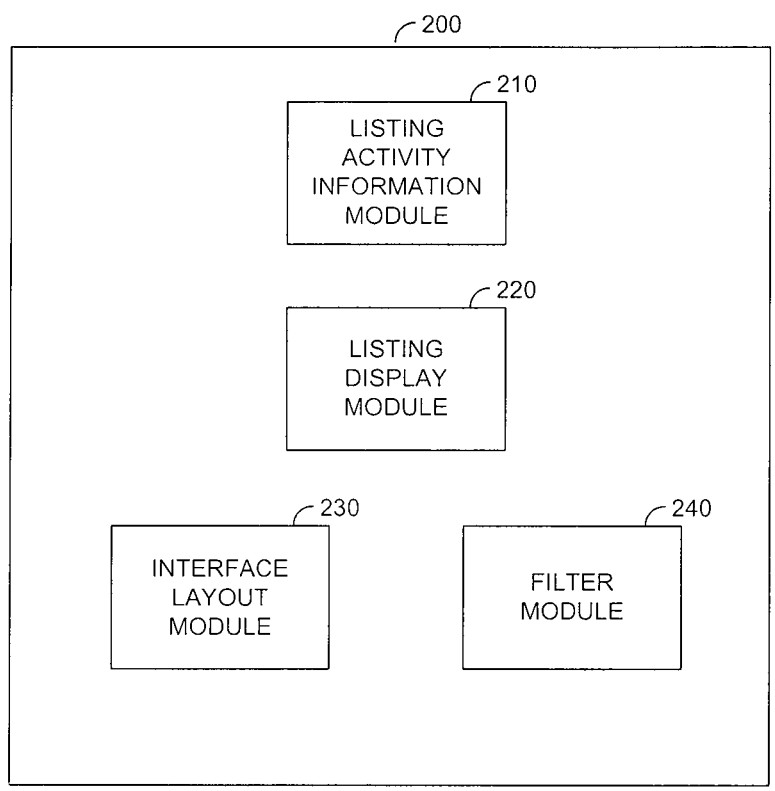
FIG. 2 is a block diagram illustrating an example embodiment of a listing engine.

FIG. 2 is a block diagram illustrating an example embodiment of a listing engine 200. In the embodiment shown, listing engine 200 includes a listing activity information module 210, a listing display module 220, an interface layout module 230, and a filter module 240. In other embodiments, however, the functionality and associated modules of the listing engine 200 may be executed within any portion of the network system 100 (e.g., the client machine 120 and the network-based marketplace 112). Additionally, the modules discussed herein are for example only, and it can be appreciated that these modules and applications may be combined into one or many modules and applications without departing from the scope of the methods and systems described herein. The modules may be implemented in digital electronic circuitry, or in computer hardware, firmware, software, or combinations thereof.

The listing activity information module 210 may monitor any number of listing activities associated with a listing. For example, the listing activity information module 210 may keep track of a listing's creation date, publication date, number of page views, number of replies, number of questions, number of bids, number of offers, number of users watching the item listing, priority level, number of link or button activations or "clicks," and the like. The activity information module 210 may distinguish between the number of distinct users associated with a listing activity versus the absolute number of times that the listing activity occurred. For example, the activity information module 210 may track that a listing has been viewed 100 times and also that the same listing has been viewed by only 80 unique users.

The listing display module 220 may analyze the listing activities monitored by the listing activity information module 210, derive information about a listing, and modify the priority of the listing (e.g., "bump up" or "bump down" the listing relative to other listings of a listing interface) based on the listing activities in order to enable the presentation of the listing earlier or later in the listing interface. In one embodiment, the listing display module 220 may modify the priority of a listing by resetting or updating the creation date or publication date associated with a listing with a more recent date. In another embodiment in which the listing has an associated priority value, the listing display module 220 may modify the priority of a listing by modifying the priority value associated with that listing.

In one embodiment, the priority of a listing may also be modified based on one or more criteria provided by the network system 100. The criteria may be provided by the network system 100 in order to pursue one or more objectives, such as presenting potential buyers with listings of items that are available; presenting potential buyers with better quality listings; increasing the visibility of a seller's item listing that is available; increasing the number of listings that receive a specific or minimum number of replies, bids, or offers; increasing the number of page views per visit; and so forth. In another embodiment, the one or more objectives may be provided by a user. For example, a user may provide the one or more objectives in the user's preferences section of the user's profile, a filter option provided in a listing interface, or search parameters in a user search.

The interface layout module 230 may compile, format, and sort the listings and prepare them to be displayed in a listing interface. For example, the interface layout module 230 may prepare a webpage containing a listing interface to be displayed on a web client 116 on a client machine 120. The listing interface may provide for each listing a graphical user interface containing text, links, graphical elements, buttons, and so on.

The filter module 240 may filter or remove certain listings from the listing interface. For example, filter parameters may be received from the network system 100 or a user identifying one or more categories of listings to include or exclude from the listing interface. These filter parameters may be received in the form of search parameters used in a search, filter options provided in a listing interface, or some other source.

Figure 3:
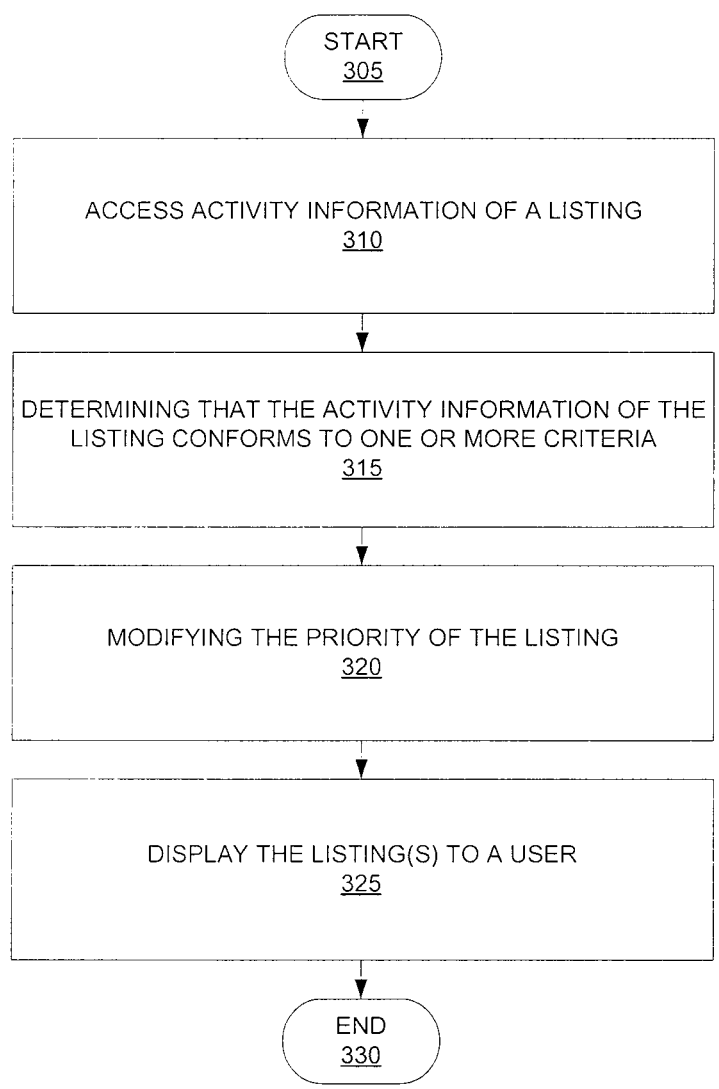
FIG. 3 is a flow chart illustrating an example embodiment of a process used in a listing engine as described herein.

FIG. 3 is a flow chart illustrating an example embodiment of a process used in a listing engine 200 (FIG. 2). When the process illustrated in FIG. 3 begins (operation 305), one or more listings are already being monitored by the listing engine 200. Listing activities associated with the listings are monitored by the listing activity information module 210. At operation 310, the listing activity information module 210 (FIG. 2) may access the listing activity information and provide it to the listing display module 220 (also FIG. 2). In another embodiment, the listing activity information module 210 may store or maintain listing activity information for the one or more listings in a database or other memory, and the listing display module 220 may access the activity information directly from the database or other memory.

The listing display module 220 may then determine that the activity information of a listing conforms to one or more criteria (operation 315). The criteria may be formulated and provided by the network system 100 in order to pursue one or more objectives. For example, one set of objectives of a network system 100 in the form of a trading/commerce system may be to increase sales on the network system, to increase the number of replies/bids/offers a listing receives, to decrease the number of listings receiving no replies/bids/offers, to increase the number of page views a listing receives, to present to potential buyers more listings that are available, and to present to potential buyers quality listings.

Based on these objectives, a set of criteria may be generated or received by a criteria module (not shown). For example, one criterion may be to only increase the priority of listings that have a reply count under a certain threshold. This way, listings that have already received many replies and may already be sold will not be presented to potential buyers early in the listing interface, so that they will not take up space early in the listing interface that could be used for listings with fewer replies that may still be available. Another criterion may be to only increase the priority of listings that have a reply count to page view count ratio within a certain range (e.g., more than a minimum threshold and less than a maximum threshold). One rationale for this criterion is that listings with a high ratio may already be performing very well and do not need to be prioritized. Listings with a low ratio may be of lower quality, whether it be an unappealing listing, unpopular product or price, or so on. As a result, the trading/commerce system may desire listings with a ratio between these thresholds to potentially receive a higher priority. Similar criteria may also be used with respect to bids, offers, and page views. Various click-through rates may also be used as criteria. For example, the listing display module 220 may only increase listings with a click-through rate above a certain threshold. One rationale for this criterion may be to increase priority for quality listings, as having a lower click-through rate may be indicative of being unappealing to a potential buyer. Other criteria may deal with how many times a listing's priority may be modified either up or down. For example, one criterion may limit a "bump up" count associated with a listing to a certain number or threshold.

In one implementation, the one or more criteria being used, and/or the listing activities being monitored, may depend on the source of the listing activities. For example, only listing activity associated with a creator or other entity connected specifically with the creation or publication of the listing, such as the seller of a product or service associated with the listing, may be employed to determine priority for the listing. Such activities may include, but are not limited to, the creation or publication date of the listing, the elapsed time since the listing was created or published, and the number of times the listing is updated or revised. In another example, only listing activity associated with a viewer of the listing may be utilized for altering the listing priority. Such activities may include, but are not limited to, click-through rates, number of page views, number of replies, number of questions, number of bids, number of offers, and the number of users watching the item listing, as described above.

Once the listing display module 220 (FIG. 2) determines that the activity information for one or more listings conforms to the criteria, the listing display module 220 may modify the priority of a listing (operation 320). In one embodiment, the priority of a listing may be decreased to decrease visibility of the listing. In other embodiments, the priority of a listing may be increased to increase the visibility of the listing. The listing display module 220 may modify the priority of a listing by, for example, modifying a creation date or a publication date associated with a listing.

In another embodiment in which listings are associated with a priority value, the priority values may be modified.

The listings may then be sorted and filtered by the filter module 240 (FIG. 2) and formatted and arranged into a listing interface by the interface layout module 230 (also FIG. 2). At operation 325, the listings may be presented to a user.

Figure 4:
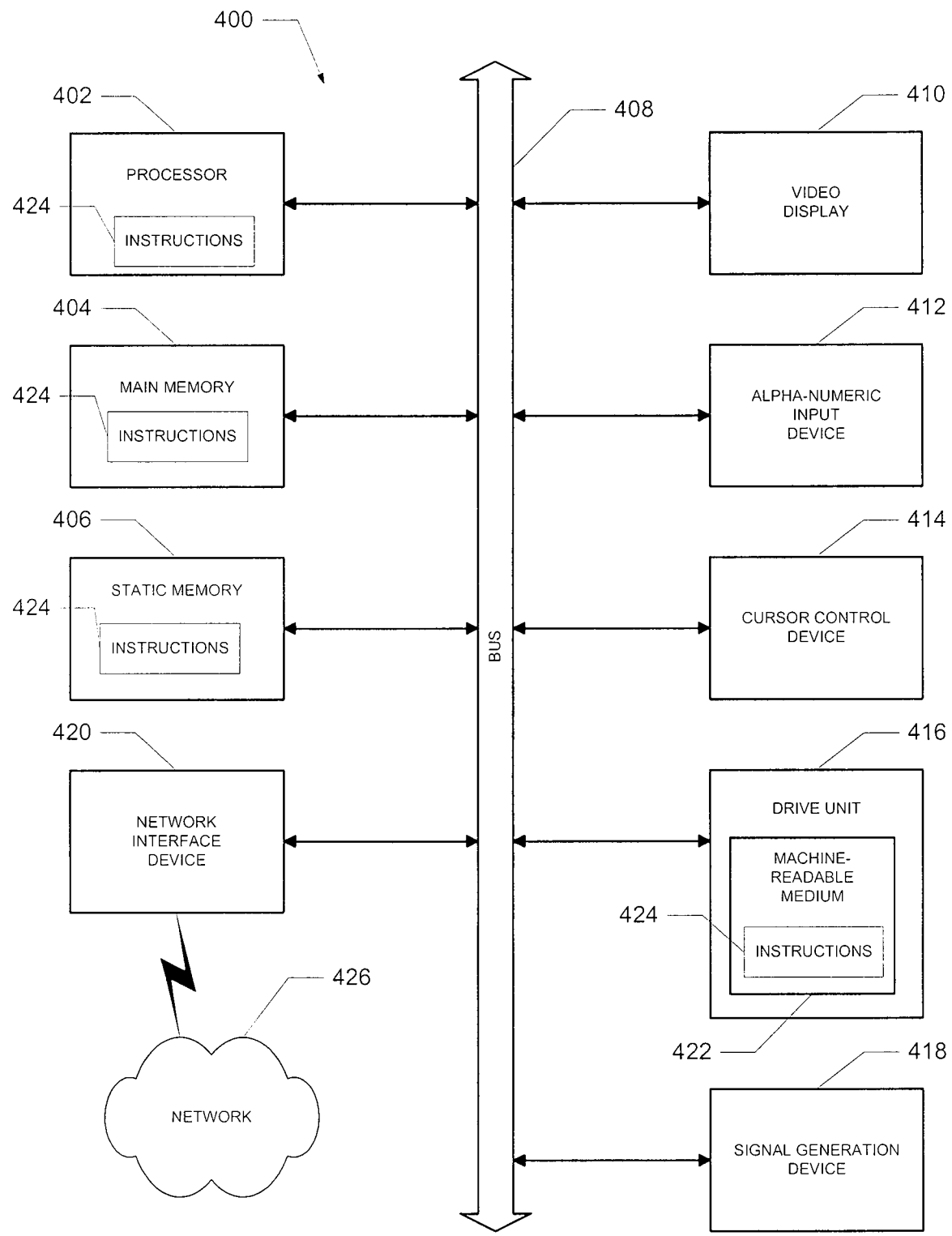
FIG. 4 shows a diagrammatic representation of a machine in the example form of a computer system within which a set of instructions, when executed, may cause the machine to perform any one or more of the methodologies discussed herein.

FIG. 4 shows a diagrammatic representation of a machine in the example form of a computer system 400 within which a set of instructions, when executed, may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone or other mobile communication device, a web appliance, a network router, a network switch, a network bridge, or any machine capable of executing a set of instructions (sequential or otherwise) that specify actions to be taken by that machine. Further, while only a single machine is illustrated, the term "machine" shall also be taken to include any collection of machines or devices that individually or jointly execute a set (or multiple sets) of instructions to perform any one or more of the methodologies discussed herein.

The example computer system 400 includes a processor 402 (e.g., a central processing unit (CPU), a graphics processing unit (GPU), or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions (e.g., software 424) embodying any one or more of the methodologies or functions described herein. The instructions 424 may also reside, completely or at least partially, within the main memory 404, the static memory 406, and/or within the processor 402 during execution thereof by the computer system 400. The main memory 404 and the processor 402 also may constitute machine-readable media. The instructions 424 may further be transmitted or received over a network 426 via the network interface device 420. While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the various embodiments, or that is capable of storing, encoding, or carrying data structures utilized by, or associated with, such a set of instructions. The term "machine-readable medium" shall accordingly be taken to include, but not be limited to, solid-state memories, optical media, and magnetic media.

We claim:

1. A method, comprising:
causing display, on a user interface of a client device, of a plurality of listings in an order, the plurality of listings including a first listing for an item for sale;
monitoring activity information of the first listing using a processor that tracks how many user interactions have been detected with the first listing over a predetermined period of time, the user interactions comprising one or more of viewing the first listing, replying to the first listing, clicking or making a selection associated with the first listing, watching the first listing, bidding on the first listing, or making an offer on the first listing;
determining, using the processor, that the activity information of the first listing conforms to one or more criteria, the one or more criteria including that a user interaction count of the first listing falls below a maximum user interaction count threshold; and
responsive to the determining that the activity information of the first listing conforms to the one or more criteria, automatically causing a reordering of the plurality of listings displayed on the user interface of the client device, the first listing appearing earlier in the reordering of the plurality of listings.

2. The method of claim 1, wherein the one or more criteria further comprises:
a ratio of the user interaction count of the first listing to a page view count of the first listing falling below a maximum reply-to-view threshold.

3. The method of claim 1, wherein the one or more criteria further comprises:
the user interaction count of the first listing exceeding a minimum user interaction count threshold denoting listing quality, the minimum user interaction count threshold being lower than the maximum user interaction count threshold.

4. The method of claim 1, wherein the one or more criteria further comprises:
a ratio of the user interaction count of the first listing to a page view count of the first listing exceeding a minimum reply-to-view threshold denoting listing quality.

5. The method of claim 1, wherein user interactions with the first listing comprise replies to the first listing.

6. The method of claim 1, further comprising:
generating the one or more criteria based on a viewer profile provided by a social media web site.

7. A system, comprising:
a memory having instructions embodied thereon; and
at least one processor of a machine configured by the instructions to perform operations comprising:
causing display, on a user interface of a client device, of a first listing among multiple listings, the first listing being for an item for sale;
continuously monitoring activities associated with the first listing;
accessing activity information of the first listing, the activity information including a number of user interactions with the first listing that have been detected, the user interactions comprising one or more of viewing the first listing, replying to the first listing, clicking or making a selection associated with the first listing, watching the first listing, bidding on the first listing, or making an offer on the first listing;
determining that the activity information of the first listing conforms to one or more criteria, the one or more criteria including that a user interaction count of the first listing falls below a maximum user interaction count threshold; and responsive to the determining that the activity information of the first listing conforms to the one or more criteria, automatically moving the first listing to a higher position on the user interface.

8. The system of claim 7, wherein the one or more criteria further comprises a ratio of the user interaction count of the first listing to a page view count of the first listing falling below a maximum reply-to-view threshold.

9. The system of claim 7, wherein the one or more criteria further comprises:

the user interaction count of the first listing exceeding a minimum user interaction count threshold denoting listing quality, the minimum user interaction count threshold being lower than the maximum user interaction count threshold.

10. The system of claim 7, wherein the one or more criteria further comprises:

a ratio of the user interaction count of the first listing to a page view count of the first listing exceeding a minimum reply-to-view threshold denoting listing quality.

11. The system of claim 7, wherein user interactions with the first listing comprise replies to the first listing.

12. The system of claim 7, wherein the operations further comprise:

generating the one or more criteria based on a viewer profile provided by a social media web site.

13. A non-transitory machine-readable medium having instructions embodied thereon that, when executed by a machine, cause the machine to perform operations comprising:

causing display, on a user interface of a client device, of a plurality of listings in an order, the plurality of listings including a first listing for an item for sale;

monitoring activity information of the first listing for user interactions over a predetermined period of time, the user interactions comprising one or more of viewing the first listing, replying to the first listing, clicking or making a selection associated with the first listing, watching the first listing, bidding on the first listing, or making an offer on the first listing;

determining that the activity information of the first listing conforms to one or more criteria, the one or more criteria including that a user interaction count of the first listing falls below a maximum user interaction count threshold; and responsive to the determining that the activity information of the first listing conforms to the one or more criteria, automatically causing a reordering of the plurality of listings to display, on the user interface of the client device, the first listing appearing earlier in the reordering of the plurality of listings.

14. The medium of claim 13, wherein the one or more criteria further comprises a ratio of the user interaction count of the first listing to a page view count of the first listing falling below a maximum reply-to-view threshold.

15. The medium of claim 13, wherein the one or more criteria further comprises the user interaction count of the first listing exceeding a minimum user interaction count threshold denoting listing quality, the minimum user interaction count threshold being lower than the maximum user interaction count threshold.

16. The medium of claim 13, wherein:

user interactions with the first listing comprise replies to the first listing.

17. The medium of claim 13, wherein the one or more criteria further comprises a ratio of the user interaction count of the first listing to a page view count of the first listing exceeding a minimum reply-to-view threshold denoting listing quality.

18. The medium of claim 13, wherein the operations further comprise:

generating the one or more criteria based on a viewer profile provided by a social media web site.

* * * * *